United States Patent [19]
Steffan

[11] Patent Number: 5,439,590
[45] Date of Patent: Aug. 8, 1995

[54] METHODS FOR TREATING TOXIC MATERIAL

[75] Inventor: Robert J. Steffan, Newtown Bucks, Pa.

[73] Assignee: Envirogen, Inc., Lawrenceville, N.J.

[21] Appl. No.: 68,116

[22] Filed: May 25, 1993

[51] Int. Cl.⁶ ............................................. C02F 3/06
[52] U.S. Cl. ................................. 210/616; 210/631; 210/691; 210/908
[58] Field of Search .................. 210/615–618, 210/631, 908, 909, 669, 691, 610, 611

[56] References Cited

U.S. PATENT DOCUMENTS

| | | | |
|---|---|---|---|
| 3,779,906 | 12/1973 | Levin | 210/616 |
| 4,469,600 | 9/1984 | Frydman et al. | 210/617 |
| 4,664,803 | 5/1987 | Fuchs et al. | 210/616 |
| 5,019,268 | 5/1991 | Rogalla | 210/617 |
| 5,217,616 | 6/1993 | Sanyal et al. | 210/617 |

*Primary Examiner*—Thomas Wyse
*Attorney, Agent, or Firm*—Wolf, Greenfield & Sacks

[57] ABSTRACT

The present invention features methods and apparatus for processing waste material held in an aqueous medium. A sorbent is added to the aqueous medium. The sorbent reduces the effective concentration of waste material allowing biodegradation of the waste material in solution. A preferred sorbent is rubber derived from ground or shredded tires.

7 Claims, 2 Drawing Sheets

METHODS FOR TREATING TOXIC MATERIAL

FIELD OF THE INVENTION

The present invention features methods and devices for treating waste materials held in an aqueous medium. Waste materials are often in concentrations that are toxic to microorganisms which would otherwise be capable of utilizing such materials in metabolic processes which totally remove the material from the environment or render such material to a less toxic form. The present invention features the use of sorbents to adsorb toxic materials to reduce the effective concentration of such materials in the aqueous medium. The reduction in concentration allows growth and the toxic materials to be acted upon by microorganisms capable of degrading such materials.

BACKGROUND OF THE INVENTION

Chemical wastes are often retained in vessels, pools or ponds in concentrations which are toxic to microorganisms. Often microorganisms are able to degrade the wastes at lower concentrations. However, indigenous microorganisms, capable of such metabolism, are in small populations due to the acute toxicity of the material to the organisms.

Nutrient addition, pH adjustment, air-stripping, or dilution have been suggested as methods for increasing microbial degradation of such toxic materials. However, these methods have met with limited success. Nutrient addition and pH adjustment appear to have little effect on microbial activity. Air-stripping tends to release the toxic materials into the air. Dilution has the effect of creating a larger volume of toxic material.

There exists a need to biodegrade toxic materials held in concentrations normally incompatible with microorganism viability. Biodegradation allows such materials to be permanently removed from the environment.

SUMMARY OF THE INVENTION

The present invention features methods and apparatus for treating waste material held in an aqueous medium. Such waste material is often found in concentrations which are toxic to organisms which otherwise would be capable of degrading such waste material. One embodiment of the present invention features a method comprising the step of adding a sorbent to the aqueous medium. The sorbent captures the waste material and reduces the effective concentration of the waste material in the aqueous medium. The waste material remaining in the aqueous medium can be acted upon by microorganisms capable of degrading the waste material at the reduced concentration. As waste material is degraded in the aqueous medium, waste material is desorbed from the sorbent to allow substantially complete degradation of the waste material.

The term "waste material" is used in a conventional sense to encompass materials which are by-products of industrial or agricultural processes, other materials which are no longer useful and materials considered to be an environmental hazard. The term "aqueous medium" is used in the sense to suggest the presence of water; however, water does not need to be the dominant chemical present. Sorbants are materials which adsorb substances as part of a physical process.

Indigenous microorganisms can act within the aqueous medium having a sorbent where the concentration of the waste material prior to the sorbent allowed a small population to remain viable. Microorganisms capable of degrading the waste material can be added to the aqueous medium after the addition of the sorbent where the concentration of the waste material has previously reduced the indigenous microbial population to a nonviable level, or to facilitate a more rapid colonization of the medium. Microorganisms capable of degrading the waste material may be loaded onto the sorbent.

One embodiment of the method features active carbon as a sorbent. One embodiment features pellets of active carbon or granular active carbon.

A preferred sorbent is rubber. Surprisingly and unexpectedly, it has been found that ground or shredded tires are capable of acting as an effective sorbent, detoxifying chemical waste pond sludge and allowing such sludge to be acted upon by microorganisms. Tires are normally considered to be a problem waste material in and of themselves. The present invention uses what is often considered an environmental problem, tires, to clean the most hazardous waste problems the environment faces.

One embodiment of the method features a sorbent held within retaining means. The retaining means allows the sorbent to be removed from the waste material and utilized at a different site if desired. Such sorbents are loaded with microorganisms capable of degrading similar wastes to speed the detoxification of such aqueous media. The retaining means also allows the sorbent to be processed apart from the aqueous medium.

One preferred retaining means comprises a wire mesh which forms a containment vessel around the sorbent. A wire mesh is particularly suitable for retaining ground or shredded tires. However, other containment vessels having holes which allow the aqueous medium to maintain contact with the sorbent are also suitable.

One embodiment of the present invention features an apparatus for detoxifying waste materials. The device comprises retaining means and a sorbent. The retaining means holds the sorbent for immersion into an aqueous medium.

One preferred retaining means is a container having walls defining an inner chamber for retaining the sorbent. The walls have openings allowing the aqueous medium to be received in the inner chamber in contact with the sorbent. A further containment vessel comprises a wire mesh which mesh forms a containment vessel around the sorbent.

A further embodiment of the present invention features a sorbent comprising shredded or ground tires.

One embodiment features retaining means for securing shredded or ground tires. The shredded or ground tires may retain enough structural integrity to be strapped together by retaining means such as strapping, ropes, cables, chains and the like.

Embodiments of the present invention allow detoxification of waste materials. The use of sorbents results in a thousand-fold increase in microbial populations. Embodiments of the present invention feature the use of an article of manufacture, normally considered an environmental problem, discarded tires, to detoxify the environment.

These and other features and advantages of the present invention will be apparent from the following description, examples and illustrations, which by way of example, demonstrate preferred embodiments of the present invention and the principles thereof, and what is now considered to be the best mode to apply these principles.

DETAILED DESCRIPTION

The present invention is described in detail as a method and apparatus for processing a chemical waste pond containing chlorobenzene and nitrobenzene carbon with the understanding that the present disclosure is to be considered in exemplification of the principles of the invention and is not intended to limit the invention to the embodiment illustrated. The present invention can be used to process other chemicals and in situations where a waste material is held in vessels, pools or any other type of containment means.

Figure 1:
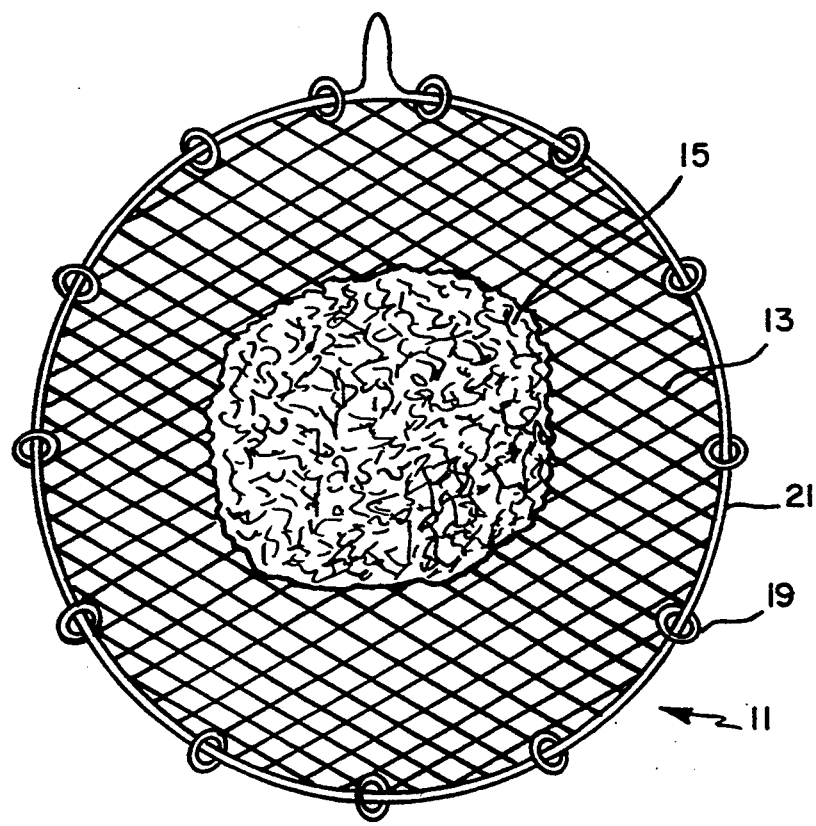
FIG. 1 depicts a quantity of rubber, derived from shredded or ground tires, placed centrally upon a wire mesh.

Turning now to FIG. 1, one embodiment of the present invention features an apparatus for detoxifying an aqueous medium containing waste material. The apparatus, generally designated by the numeral 11, is comprised of retaining means 13 and a sorbent material 15.

The active carbon material 15 in FIG. 1 is ground or shredded tires. The tires are ground to a particulate size ranging from 40 mesh to dust, from cuboidal particles to long shreds. However, active carbon in the form of pellets or granules may also be used.

Figure 2:
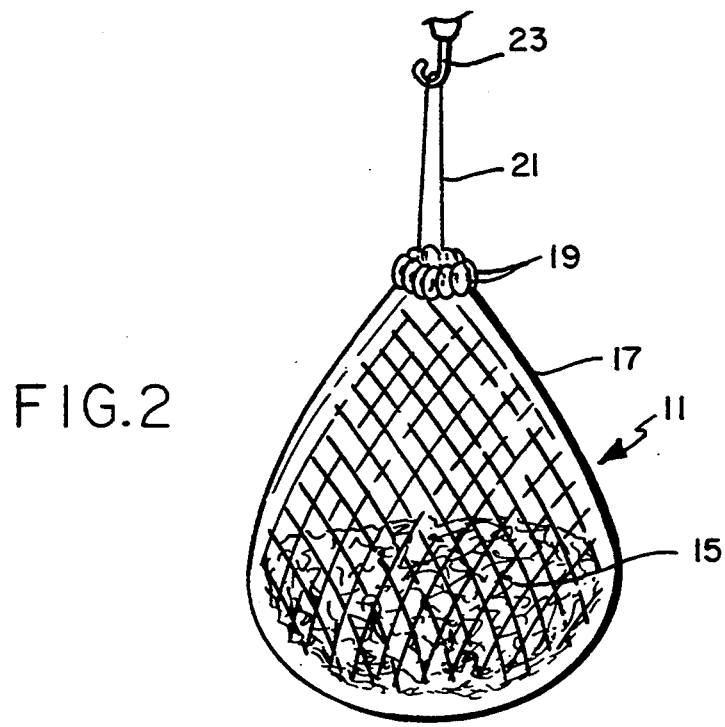
FIG. 2 illustrates the wire mesh surrounding the rubber.

The retaining means 13 is a wire mesh 17 having a mesh size smaller than the size of the ground tires to retain the material. As illustrated, wire mesh 17 is circular; however, wire mesh may have any geometric shape which will allow it to retain the active carbon material 15. The wire mesh has a plurality of rings 19 positioned at spaced intervals about the outer edge. Rings 19 hold a cable 21 which encircles the wire mesh 17. Cable 21 is suitable for being received by a hook 23 of a crane (not shown), as best seen in FIG. 2. As cable 21 is pulled upward, the diameter of cable 21 retained in rings 17 becomes smaller allowing the wire mesh 11 to encircle and envelop the active carbon material 15.

In operation, the apparatus 11 is loaded with material 15 such as ground tires by placing the wire mesh 17 on a flat surface, as illustrated in FIG. 1. An sorbent material 15 such as ground tires, is placed within a central area of the mesh 13. Cable 21 is received by a hook 23 of a crane (not shown). Upon lifting the cable 21, the effective radius of cable 21 held in rings 19 is reduced bringing the wire mesh 17 up around the sorbent material 15.

The entire apparatus 11 is placed in an aqueous medium, for example a sludge pond (not shown). The material 15, such as ground tires, adsorb waste material which is toxic to microorganisms. The effective concentration of the waste material is reduced. The indigenous microorganisms, or microorganisms which are added to the aqueous medium after placement of the device 11, metabolize and degrade the waste material. Such microorganisms are not killed by the waste material due to the reduction in effective concentration. As the microorganisms metabolize the waste material, waste material retained by the sorbent is desorbed, allowing complete biological degradation of the waste material.

EXAMPLES

Example 1

Embodiments of the present invention were applied to chemical waste pond medium containing 15,000 parts per million chlorobenzene and 3,000 parts per million nitrobenzene. The pond sludge initially revealed only low levels of indigenous microbial activity of approximately $10^4$ cells cfu/ml. The pond sludge appeared toxic to microorganisms that were nonindigenous. At least some of the indigenous microorganisms appeared to be capable of degrading chlorobenzene.

The chemical waste pond sludge was evaluated with the following treatments, 1) nutrient addition; 2) pH adjustment; 3) air-stripping; 4) dilution to 1:20. These treatments appeared to have little effects on microbial activity.

Two groups of serum vials containing identical amounts of sludge pond were made. One group of vials received rubber derived from ground up or shredded tires in varying amounts of 0.01, 0.075, 0.05, 0.025, and 0.001 gm/ml. One group of vials received activated carbon in a particulate form (Norit RB4) in varying amounts of 0.1, 0.075, 0.05, 0.025 and 0.001 gm/ml. Each group was cultured for six (6) days at 22° C.

The vials receiving granular active carbon or rubber exhibited a thousand-fold increase in microbial numbers during a five-day incubation. These results are summarized in Table 1 below.

TABLE 1

| Effect of Detoxifying Agents on Microbial Activity | |
|---|---|
| Amount Added | CFU/mL |
| Rubber | |
| 0.1 g/mL | $1 \times 10^6$ |
| 0.075 g/mL | $1 \times 10^6$ |
| 0.05 g/mL | $1 \times 10^6$ |
| 0.025 g/mL | $3 \times 10^4$ |
| 0.001 g/mL | $4 \times 10^4$ |
| Carbon | |
| 0.1 g/mL | $1 \times 10^6$ |
| 0.075 g/mL | $3 \times 10^6$ |
| 0.05 g/mL | $1 \times 10^6$ |
| 0.025 g/mL | $4 \times 10^4$ |
| 0.001 g/mL | $5 \times 10^4$ |

Example 2

This example highlights the ability of microorganisms to degrade toxic materials, which materials have a reduced effective concentration due to the presence of sorbents. Samples of the sludge having no indigenous microorganisms were sealed in 125 ml serum vials. One group of vials received a dilution of sludge with basal salts medium (bsm:1:10), and 0.1 g/ml of rubber derived from tires. A second group of vials received a dilution of sludge with basal salts medium, and 0.1 g/ml granulated active carbon (Norit RB4). A third group received a 1:2 dilution of sludge with basal salts medium. Each of the three groups was further divided into two subgroups. One subgroup received a live pure culture of a chlorobenzene degrading microorganism, the second subgroup was poisoned with NaOH to prevent biological activity and to measure abiotic losses.

Following 24 and 72 hour incubation periods, vials from each subgroup were evaluated for chlorobenzene degradation. These results are summarized in Table 2.

TABLE 2

Chlorobenzene Degradation

| Sample | Chlorobenzene Remaining (mg/L) | |
|---|---|---|
| | 24 h | 72 h |
| "500 ppm" (killed) | 410 | 400 |
| "500 ppm" | BDL | BDL |
| "500 ppm: + Rubber (killed) | 470 | 340 |
| "500 ppm" + Rubber | 10 (8.2) | BDL |
| "1000 ppm" (killed) | 910 | 608 |
| "1000 ppm" | 840 (19) | 500 (190) |
| "1000 ppm" + Rubber (killed) | 910 | 790 |
| "1000 ppm" + Rubber | 40 (0.9) | 1.7 (2.4) |

(SD) n = 3; killed controls n = 2; BDL = below detection limit.

The chlorobenzene concentration of 500 ppm corresponds to the upper limit of toxicity to the microorganisms used in this example. The chlorobenzene concentration of 1000 ppm represents a normally toxic level of chlorobenzene to the microorganism. The data suggests that the sorbent allowed the microorganism to degrade normally toxic levels of chlorobenzene. The vials receiving rubber exhibited greater than 98% reduction of chlorobenzene.

Example 3

This example highlights the degradation of chlorobenzene and nitrobenzene by microorganisms in the presence of sorbent.

The experiment was designed by using a 2×4 treatment matrix as shown in Table 3 below:

TABLE 3

| Dilution | Treatment | | | | |
|---|---|---|---|---|---|
| | No Bacteria | Bacteria Only | Rubber + Bacteria | Granular + Bacteria | Killed + Bacteria |
| 1:2 | | n = 3 | n = 3 | n = 3 | n = 2 |
| 1:10 | | n = 3 | n = 3 | n = 3 | n = 2 |

Samples were incubated on their sides at room temperature (approx. 20° C.) with constant shaking (250 rpm) on a rotary shaker, and entire samples were sacrificed at 0, 14, 21 and 35 days.

All samples were prepared in 125 ml serum bottles. Each serum bottle received 2.4 ml of 10x basal salts medium (BSM). Samples being diluted 1:2 or 1:10 received 6.6 and 18.6 ml of distilled water, respectively. Samples treated with bacteria (all samples but those labeled "None") received 6 ml of a washed cell suspension in 1x BSM, and those not treated with bacteria received an additional 6 ml of 1x BSM. The final nutrient amendment was, therefore, equal to 1x BSM. The cell suspension was prepared by combining 1 L of a chlorobenzene-degrading mixed culture ($OD_{550}=1.5$) that had been enriched for from Pond 1 sludge and sediment with 2 L of Rariton Valley Sewage Treatment Facility activated sludge. The cell suspension was centrifuged, washed twice with 1x BSM, and resuspended in 2 L 1x BSM.

Samples treated with absorbents received 3 g of either rubber derived from ground tires or granular activated carbon (Norit RB4). Pond 1 sludge was mixed and poured into a large flask and stirred continually on a magnetic stir plate. A volume of 3 ml or 15 ml of the sludge was pipetted into serum vials to establish final dilutions of 1:10 and 1:2, respectively. Each bottle was immediately gassed with pure oxygen (5 sec. at approximately 3 L/min) and sealed with a teflon-coated butyl rubber septa and aluminum crimp cap. Killed samples were amended with 5 ml of 10N NaOH. Samples were placed onto a shaker and incubated as described above.

Analysis of chlorobenzene and nitrobenzene was performed by injecting 10 ml of methylene chloride through the sealed septa, and shaking for 1 min. Samples were then transferred to a separatory funnel, and an additional 20 ml of methylene chloride was added to rinse the sample container. The rinse was added to the separatory funnel, NaOH was added to increase the pH to >11, and the samples were shaken for 2 min. The phases were allowed to separate and the methylene chloride was transferred through a layer of anhydrous sodium sulfate and glass wool to a separate container. An additional 30 ml of methylene chloride was added to the aqueous phase and the extraction was repeated. When necessary, a third extraction was performed.

A fraction of the combined extracts was filtered, diluted, and analyzed by using gas chromatography (Varian 3400). Conditions used for chromatography were as follows: Column—30M Vocol capillary; Injector — Isothermal split/splitless at 225° C., 1 µl injection using solvent flush and hot needle technique; Detector—Photo-Ionization (PID) for chlorobenzene and Electron Capture (ECD) for nitrobenzene both at 225° C. and in series; Integration—Viarian Star data system. Contaminant concentration was determined by comparing peak areas to an average response factor obtained from analyzing a 5-point calibration curve. Analytical quality control included the analysis of extraction blanks, blank matrix spikes, matrix spikes, surrogate spikes, and check standards.

Several analyses were performed to determine the baseline concentrations of Pond 1 sludge contaminants. The analyses utilized standard EPA methods for measuring volatile organics (EPA 624; purge and trap), and base neutral/acids (EPA 624). Results of analyses indicated that >95% of the contaminants were associated with the solid fraction. The method used in this example also allowed for simultaneous analysis of both contaminants without splitting of the sample.

The percent degradation was calculated by dividing the concentration measured in the experimental sample by that in the killed controls. Results obtained from the biotreatability study suggest both chlorobenzene and nitrobenzene were biodegraded in diluted Sludge 1 amended with solid absorbents. These results are summarized in FIG. 3(A)-(B).

Figure 3A:
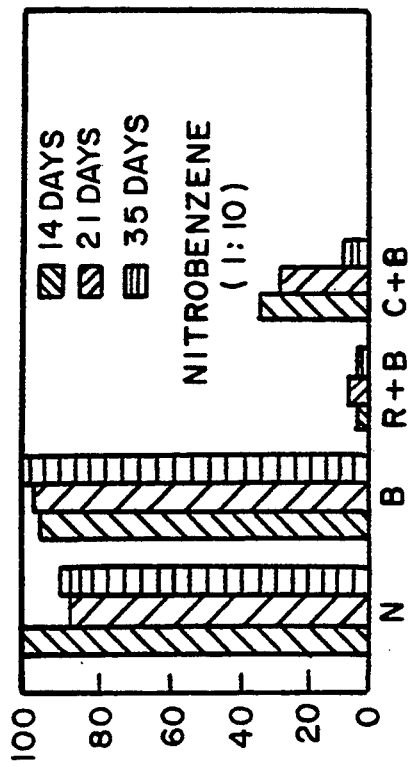
FIG. 3A–D depicts in bar graph form nitrobenzene and chlorobenzene percent degradation over time.

FIG. 3(A) depicts in bar graph form the degradation of a 1:10 dilution of chlorobenzene. As used in the Figure, N represents the absence of bacteria, B represents the presence of bacteria, R&B represents the presence of rubber and bacteria and C&B represents the presence of active carbon and bacteria. The lined bar, having lines extending upward from left to right, the first bar each series, represents the relative concentration after fourteen days; the lined bar, having lines extending downward from left to right, the second bar in each series, represents the relative concentration after twenty-one days and the lined bar having lines extending horizontally, the third bar in each series, represents the relative concentration after thirty-five days. The data suggests that chlorobenzene concentrations were effectively reduced in an aqueous medium in the presence of active carbon or rubber. The samples receiving rubber were almost completely detoxified after fourteen days. Samples which received bacteria only, or no bacteria remained substantially at the initial concentration.

Figure 3C:
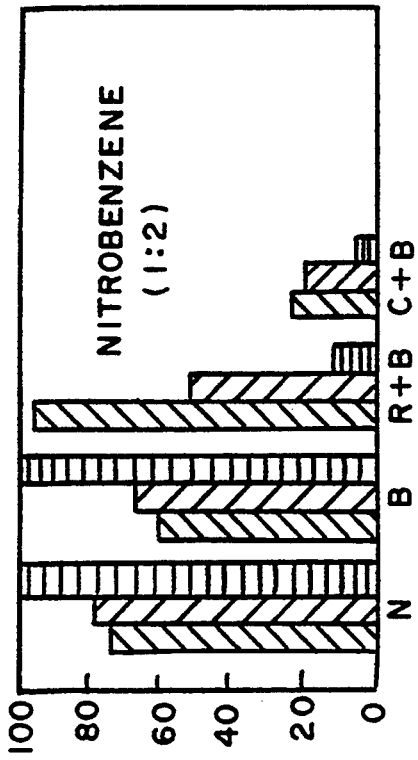
Figure 3B:
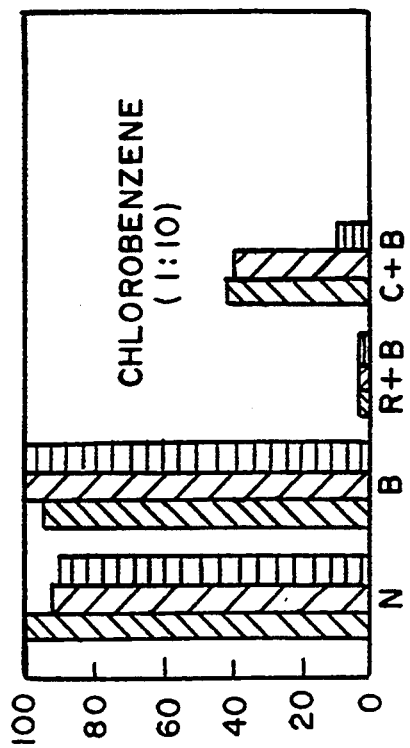

FIG. 3(B) depicts in bar graph form the degradation of chlorobenzene in samples receiving no bacteria (N), bacteria only (B), rubber and bacteria (R&B) and active carbon and bacteria (C&B). The three bars again represent fourteen days, twenty-one days and thirty-five days respectively. The data suggests, even at the much higher concentration, samples receiving rubber and active carbon were substantially degraded with very little chlorobenzene remaining after thirty-five days. Similar results are depicted for examples featuring nitrobenzene as a toxic waste.

Turning now to FIG. 3(C), the degradation of nitrobenzene having a concentration of 1:10 is depicted in bar graph form. Samples receiving no bacteria (N), bacteria only (B), rubber and bacteria (R&B) and active carbon and bacteria (C&B) were monitored at fourteen days (lines extending upward left to right), twenty-one days (lines extending downward left to right) and thirty-five days (horizontally lined bar). These data suggest that samples receiving rubber and bacteria were substantially degraded at fourteen days. Samples receiving active carbon and bacteria exhibited a substantial reduction in nitrobenzene degradation at fourteen days continuing through day thirty-five. Samples receiving no bacteria or bacteria only showed no substantial change over the thirty-five day period.

Figure 3D:
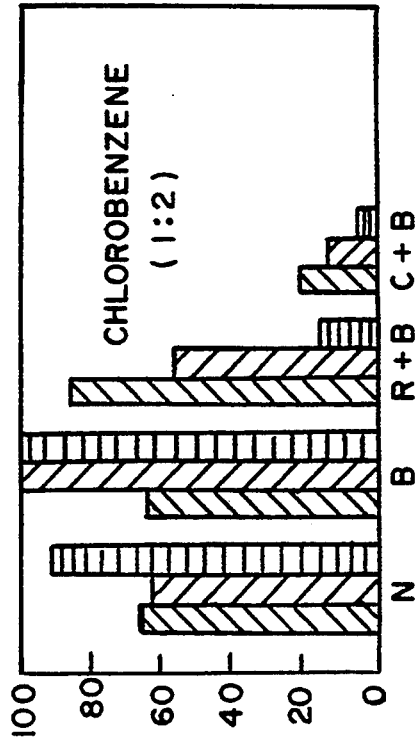

FIG. 3(D) depicts degradation of nitrobenzene samples having a concentration of 1:2 in bar graph form. Samples receiving no bacteria (N), bacteria only (B), rubber and bacteria (R&B) and active carbon and bacteria (C&B) were monitored at fourteen days (lines extending upward left to right), twenty-one days (lines extending downward left to right) and thirty-five days (horizontally lined bar). These data suggest that samples receiving rubber and bacteria or carbon and bacteria were substantially degraded at the completion of the thirty-five day period. The rubber containing samples exhibited a steady decline whereas the carbon containing samples exhibited an initially sharper decline. Samples receiving no bacteria or bacteria only exhibited no reduction in nitrobenzene concentration during the same period.

Further analysis has demonstrated a reduced contaminant recovery (extraction efficiency) in samples treated with granulated active carbon that had been shaken for >48h. This decrease was due to fragmentation of the activated carbon pellets which resulted in emulsification of the aqueous and organic phases during the extraction, resulting in lower solvent recovery. This decrease in recovery, however, can not account for the total loss of contaminants observed in the experimental samples treated with granulated active carbon. Oxygen consumption data provide further evidence of biological activity. The exact amount of contaminants biologically removed, however, is not certain.

In contrast, sorbents in the form of rubber did not effect recovery of the contaminants monitored in this study. Biological degradation of both contaminants is apparent in all rubber processed samples. Greater than 95% of both chlorobenzene and nitrobenzene were removed from 1:10 diluted sludge within the first 2 weeks of incubation. Greater than 85% of both contaminants were removed from 1:2 diluted sludge after 35 days of incubation.

Biological degradation of chlorobenzene and nitrobenzene was minimal in samples not amended with absorbents, and was not affected by the addition of supplementary microorganisms. Previous work has demonstrated that a 1:10 dilution of the Pond 1 sludge is not sufficient to reduce the toxicity of the sludge enough to permit enhanced biological activity.

The present examples have used microorganisms which degrade chlorobenzene and nitrobenzene. Such organisms are readily available from waste ponds and sludges containing such chemicals. The organisms are not considered to be special in this regard and have not been further characterized. Microorganisms which degrade chlorobenzene, nitrobenzene or other chemicals are often found in environments containing such chemicals. Any such microorganism, acclimated to a chemical which needs to be degraded, can be used in the context of the present invention.

Although the invention should not be limited to a particular mode of operation, it is believed that the sorbents bind the contaminants and reduce their effective concentrations in the aqueous phase, thereby reducing the toxicity of the sludge. The contaminants are still biologically available for degradation. The sorbents apparently act as a buffer against high concentrations of contaminants in the aqueous phase.

Thus, while preferred embodiments of the present invention have been described, the present invention is capable of variation and modification and, therefore, the present invention should not be limited to the precise details set forth, but should include such changes and alterations as follows in the purview of the following claims.

What is claimed is:

1. A method of processing waste material held in an aqueous medium, which aqueous medium has a concentration of waste material which is toxic to organisms capable of degrading such waste material, comprising:
   a) adding a sorbent to the aqueous medium, said sorbent reducing the effective concentration of said waste material in the aqueous medium said sorbent comprising rubber derived from tires;
   b) biodegrading the waste material in the aqueous medium with microorganisms, said sorbent desorbing said waste material as the waste material in solution is degraded by the microorganisms to allow removal of said waste material from the aqueous medium.

2. The method of claim 1 further comprising the step of adding a microorganism to the aqueous medium following the addition of the sorbent.

3. The method of claim 1 wherein said sorbent is held by retaining means.

4. The method of claim 3 wherein said retaining means is a mesh forming a containment vessel around the sorbent.

5. The method of claim 3 wherein the retaining means is a containment vessel having walls defining an inner chamber for retaining the sorbent and having openings, said inner chamber in fluid communication with the exterior of the containment vessel via said opening to allow movement of the aqueous medium into the containment vessel chamber.

6. The method of claim 1 further comprising adding microorganisms to the aqueous medium, said microorganisms capable of degrading said waste material.

7. The method of claim 1 wherein said rubber derived from tires is ground or shredded.

* * * * *